US011496798B2

(12) United States Patent
Walls et al.

(10) Patent No.: US 11,496,798 B2
(45) Date of Patent: *Nov. 8, 2022

(54) VIDEO RENDERING SYSTEM

(71) Applicant: Avago Technologies International Sales Pte. Limited, Singapore (SG)

(72) Inventors: Frederick George Walls, Grafton, WI (US); Richard Hayden Wyman, Sunnyvale, CA (US); Jason William Herrick, Pleasanton, CA (US); David Wu, San Diego, CA (US); Brett J. Andrews, Huntington Beach, CA (US); Wade Keith Wan, Villa Park, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 113 days.

This patent is subject to a terminal disclaimer.

(21) Appl. No.: 17/086,145

(22) Filed: Oct. 30, 2020

(65) Prior Publication Data

US 2021/0051365 A1   Feb. 18, 2021

Related U.S. Application Data

(63) Continuation of application No. 15/951,039, filed on Apr. 11, 2018, now Pat. No. 10,856,040.

(60) Provisional application No. 62/579,806, filed on Oct. 31, 2017.

(51) Int. Cl.
*H04N 21/4402* (2011.01)
*H04N 21/426* (2011.01)
*H04N 21/44* (2011.01)
*G06T 5/40* (2006.01)
*H04N 5/268* (2006.01)

(52) U.S. Cl.
CPC ....... *H04N 21/440218* (2013.01); *G06T 5/40* (2013.01); *H04N 5/268* (2013.01); *H04N 21/42653* (2013.01); *H04N 21/44008* (2013.01)

(58) Field of Classification Search
CPC ..... H04N 21/440218; H04N 21/42653; H04N 21/44008; H04N 5/268; G06T 5/40
USPC ............... 348/631, 453, 571; 345/591, 520
See application file for complete search history.

(56) References Cited

U.S. PATENT DOCUMENTS

| | | | | |
|---|---|---|---|---|
| 10,134,444 B2 * | 11/2018 | Mertens | ................. | H04N 19/17 |
| 10,217,198 B2 * | 2/2019 | Van Der Vleuten | ... | H04N 19/98 |
| 10,313,687 B2 * | 6/2019 | Stessen | ................. | H04N 19/98 |
| 10,902,567 B2 * | 1/2021 | Mertens | ................. | H04N 9/68 |
| 2005/0122335 A1 * | 6/2005 | MacInnis | ................. | H04N 5/45 |
| | | | | 348/E7.012 |
| 2007/0030276 A1 * | 2/2007 | MacInnis | ................. | H04N 9/75 |
| | | | | 345/505 |
| 2011/0280307 A1 * | 11/2011 | MacInnis | ............... | H04N 19/42 |
| | | | | 375/240.15 |

(Continued)

*Primary Examiner* — John W Miller
*Assistant Examiner* — Sean N. Haiem
(74) *Attorney, Agent, or Firm* — Bakerhostetler

(57) ABSTRACT

An apparatus for improved rendering includes a number of processing channels to receive multiple input content sources and to process that input content. A compositor can composite processed input content to generate a composite output signal. An output adaptation block can adapt the composite output signal along with dynamic metadata for display by a display device. Each processing channel includes a statistics generator and an input adaptation block.

20 Claims, 12 Drawing Sheets

(56) References Cited

U.S. PATENT DOCUMENTS

| | | | |
|---|---|---|---|
| 2016/0203618 A1* | 7/2016 | Li | H04N 1/60 345/591 |
| 2016/0205367 A1* | 7/2016 | Wallace | G06T 5/009 348/571 |
| 2016/0205368 A1* | 7/2016 | Wallace | H04N 9/64 348/571 |
| 2016/0205369 A1* | 7/2016 | Wallace | G06T 5/009 348/571 |
| 2016/0205370 A1* | 7/2016 | Wallace | G06T 5/009 348/571 |
| 2016/0205371 A1* | 7/2016 | Wallace | G06T 5/007 348/571 |
| 2016/0205372 A1* | 7/2016 | Liu | H04N 9/67 348/453 |
| 2016/0307602 A1* | 10/2016 | Mertens | H04N 19/46 |
| 2016/0358346 A1* | 12/2016 | Hendry | G06T 11/001 |
| 2016/0358584 A1* | 12/2016 | Greenebaum | G06F 3/04847 |
| 2017/0180579 A1 | 6/2017 | Mertens | |
| 2017/0180759 A1* | 6/2017 | Mertens | H04N 19/186 |
| 2017/0223367 A1* | 8/2017 | Stessen | H04N 19/98 |
| 2017/0330529 A1* | 11/2017 | Van Mourik | G09G 5/02 |
| 2018/0005356 A1* | 1/2018 | Van Der Vleuten | H04N 5/2355 |
| 2018/0276801 A1* | 9/2018 | Stessen | H04N 19/85 |
| 2018/0278985 A1* | 9/2018 | De Haan | H04N 21/845 |
| 2018/0336669 A1* | 11/2018 | Mertens | H04N 5/265 |
| 2019/0052908 A1* | 2/2019 | Mertens | H04N 19/102 |
| 2019/0073756 A1* | 3/2019 | Stessen | H04N 9/64 |
| 2019/0089956 A1* | 3/2019 | Stessen | H04N 19/30 |

* cited by examiner

VIDEO RENDERING SYSTEM

CROSS-REFERENCE TO RELATED APPLICATIONS

This application is a continuation of application Ser. No. 15/951,039, filed on Apr. 11, 2018, which claims the benefit of U.S. Provisional Application No. 62/579,806, filed on Oct. 31, 2017, the entirety of each of which is incorporated herein by reference for all purposes.

TECHNICAL FIELD

The present description relates generally to video processing, and more particularly, to video rendering systems and methods.

BACKGROUND

Video rendering is generally performed when an electronic device receives video data and outputs the video data to a display device for display. Recent advances in display technology have improved the color volume, dynamic range, and brightness of display devices. International standards such as an International Telecommunication Union (ITU)-T Recommendation BT.2020 and ITU-T Recommendation BT.2100 have attempted to create signal formats that allow carriage of video content that utilizes a larger color volume including wide color gamut (WCG) content, high dynamic range (HDR) content, and/or high brightness (HB) content available in these devices. However, consumer display devices have yet to be able to render the full extent of these supported signal formats. Additionally, many existing display devices do not even support reception of video content using these standards. Therefore, a set-top box (e.g., a dongle, a receiver, a personal computer, a converter, a disc player or the like) or a similar type of terminal device may have to adapt HDR, WCG, and/or HB content to the capabilities of the display. A display device that supports reception of video content using one or more of these standards may have to adapt HDR, WCG, and/or HB content to its own capabilities. These types of adaptation can be referred to as color volume and luminance adaptation (CVLA).

A simple CVLA that may be present in a display device would include a static luminance remapping so that bright areas of the image are compressed down to lower than the maximum brightness of the display device, and a color clipping function that either compresses or clips colors at the edge of or outside of the supported gamut. But the display rendering resulting from these techniques may appear washed out or with loss of detail or color accuracy.

BRIEF DESCRIPTION OF THE DRAWINGS

Certain features of the subject technology are set forth in the appended claims. However, for purposes of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without one or more of the specific details. In some instances, structures and components are shown in block diagram form in order to avoid obscuring the concepts of the subject technology.

In one or more aspects of the subject technology, systems and configurations are described for improving video rendering. The subject technology can enhance user experience, for example, by improving the appearance of standard dynamic range (SDR), high dynamic range (HDR), wide color gamut (WCG), and/or high brightness (HB) video content passed from a set-top box (STB) to a display device. The video content may be a composite of video content provided based on a number of input video data and/or one or more graphics data. The subject technology further allows providing dynamic metadata associated with one or more input video data as well as corrections to processing paths of other input video data and/or one or more graphics data. In some implementations, the processes of the subject technology may be implemented by hardware (HW) and software (SW) in a STB (e.g., a dongle, a receiver, a personal computer, a converter, a disc player or the like). In one or more implementations, the processes of the subject technology may be implemented in a display device (e.g., a television or a monitor) and/or in a broadcasting system (e.g., a broadcasting station equipment, a computing device such as personal computer or a laptop, a smart communication device such as a cell phone or a tablet, or other broadcasting equipment and devices). The dynamic metadata as provided by the existing solutions may not take into account the modifications in the video content as being processed by the STB, and may result in incorrect rendering, flickering, washed-out video, and/or other undesirable visual artifacts. The subject technology, among a number of advantageous features, allows for taking into account modifications and changes due to processing of the input video content by processing steps following the compositing and/or blending, for example by a display device, through using suitable inverse functions, as described herein.

Figure 1:
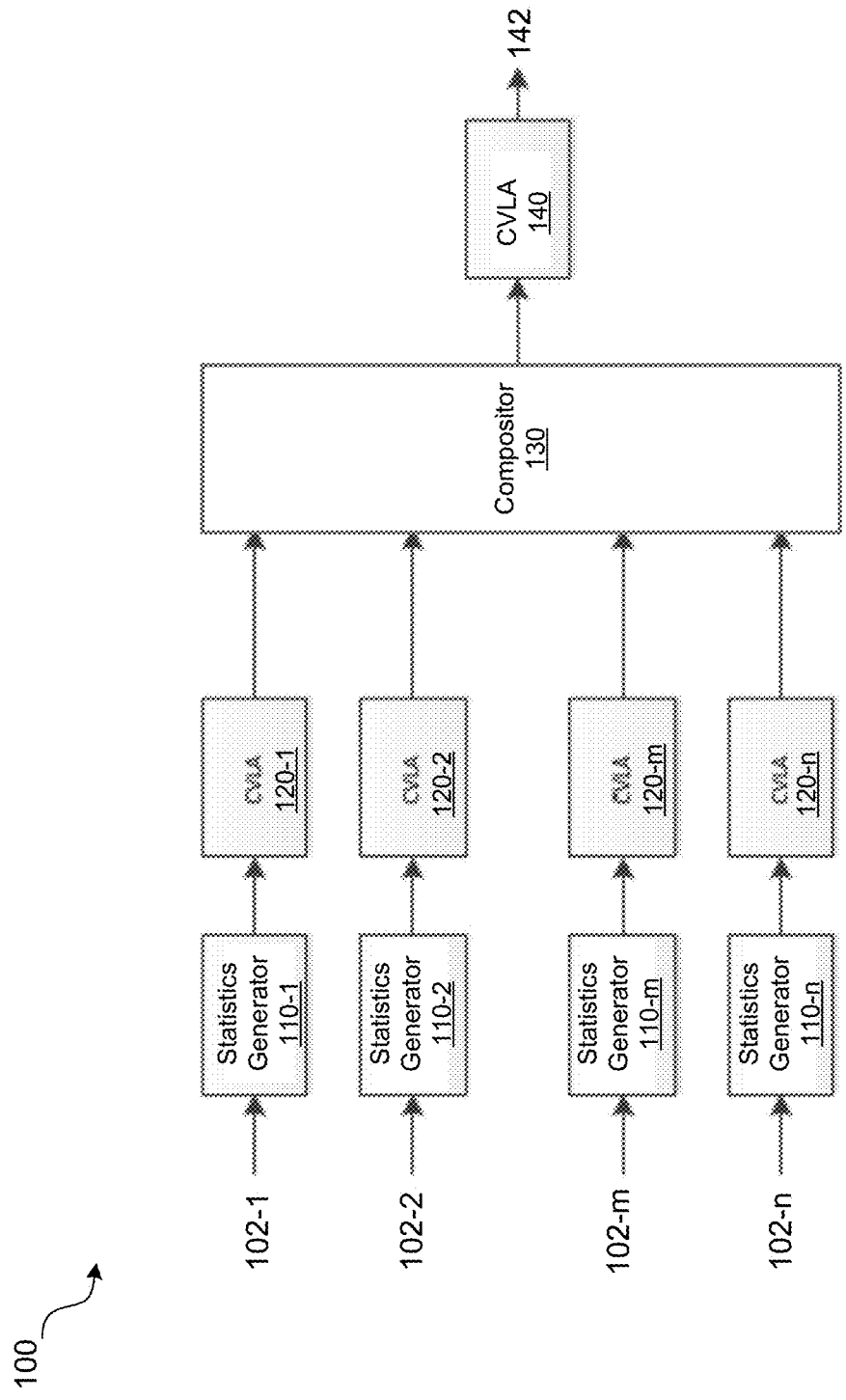
FIG. 1 is a high-level block diagram illustrating an example of a system with improved video rendering, according to aspects of the subject technology.

FIG. 1 is a high-level block diagram illustrating an example of a system, such as a set-top-box (STB) 100, with improved video rendering, according to aspects of the subject technology. In general, the term STB, as referred to in the present disclosure, may represent a video composing subsystem. The STB 100 includes a number of statistic generator blocks (e.g., circuits) 110 (e.g., 110-1 through 110-n), a number of input adaptation blocks such as color volume and luminance adaptation (CVLA) blocks (e.g., circuits) 120 (e.g., 120-1 through 120-n), a compositor 130 and an output adaptation block such as a CVLA block (e.g., circuits) 140. In one or more implementations, the statistic generator blocks 110-1 through 110-m receive input video content 102 (e.g., 102-1 through 102-m) from a number of (e.g., m) video content sources. The statistic generator blocks 110-n receives a graphics input 102-n from a graphics source. In one or more implementations, the video content sources and the graphics source can be storage devices (e.g., hard-disk drive, flash memory or other type of storage), a radio frequency (RF) circuit (e.g., an analog frontend, a tuner, or a demodulator), or a wired network (e.g., Ethernet) interface or a wireless network (e.g., Wi-Fi, Bluetooth, or other network) interface.

In one or more implementations, the statistic generator 110 includes suitable circuitry, logic, and/or code to compute statistics on a respective input video or graphics content 102. Example of the statistics includes a histogram, a binned histogram, a two-dimensional histogram, a three-dimensional histogram, a minimum, a maximum, a sum or an average of one or more quantities. Examples of these quantities include luminance values, red (R), green (G) and blue (B) component values or a MAX (a*R, b*G, c*B) or a SUM (d*R, e*G, f*B) for each pixel of the respective input content 102, where a, b, c, d, e, and f are constant values and MAX and SUM respectively represent maximum and sum functions. In one or more implementations, the statistic generator 110 can compute statistics based on a luma difference or a color difference representation, for example, color family spaces Y'Cb'Cr' and I'Ct'Cp', where Y' and I' respectively represent luma and volume and Cb', Cr', Ct' and Cp' represent color differences.

In one or more implementations, the CVLA block 120 includes suitable circuitry, logic, and/or code to perform volume transformation and static and dynamic tone mapping. The CVLA block 120 may, for example, include non-linearity and color space transformation hardware (HW) modules controlled by a processor, as described in more detail herein. In one or more implementations, the CVLA blocks 120 (e.g., 120-1 through 120-n) can be configured differently based on the input content 102. The parameters used for CVLA blocks 120 may be static for a given usage mode or may vary in response to the video or graphics content that is being adapted. Information about the source video or graphics (e.g., luminance/brightness or color difference histograms, average picture level, average brightness, peak brightness, scene statistics, region-based statistics, metadata, etc.) may be used to help derive suitable parameters.

The compositor 130 includes suitable circuitry, logic, and/or code to receive output video content from processing channels including the statistics generators 110 and the CVLA blocks 120 and to composite video and graphics content and/or blend colors as needed. The output of the compositor 130 is further processed by an output adaptation block such as a CVLA block 140. A compositing function of the compositor 130 can combine graphics or video content from multiple sources into a single output format. The compositing function may include alpha-blending, which combines different fractions for each pixel location of one or more video and/or graphics content of different sources. Before compositing occurs, video and/or graphics content may be converted (e.g., using the CVLA block 120) to a common video format (e.g., using the same color space and the same transfer function or no transfer function). After compositing by the compositor 130, the resulting composited video content may be converted using an output adaptation block such as the CVLA block 140 to adapt to a desired output format that may optionally include static or dynamic metadata, as further described below.

A video or graphics source may also be used as a texture in a 3D graphics engine. Many of the methods described herein can also be used for rendering of such textures. The brightness of the textures can change with lighting and such effects can be considered when determining the parameters for the CVLA block 140. The CVLA block 140 can adapt the composite output signal of the compositor 130 for an output device (e.g., a display device or a decoder). The composite output signal can be a video signal that has multiple video and/or graphics sources blended together or composited for presentation. In some implementations, the compositor 130 receives, from the output device, output parameters including peak brightness, color primaries, an overall output dynamic range.

Returning to the statistic generation, in one or more embodiments, the statistics computation is performed by the statistics generators 110 on sources before compositing is performed as described above. In some embodiments, the statistics computation is performed on the output video before it is sent out for display, for example, after the CVLA block 140. In one or more embodiments, the statistics computation is performed on the output video, but it is applied to the subsequent output video frame. In other embodiments, the video signal is captured to a memory in order to allow statistics and corresponding metadata to be computed and aligned with the delayed output frame. The statistics may be used in conjunction with a scene-change detection algorithm to derive estimates for the cumulative statistics for a scene.

Figure 2:
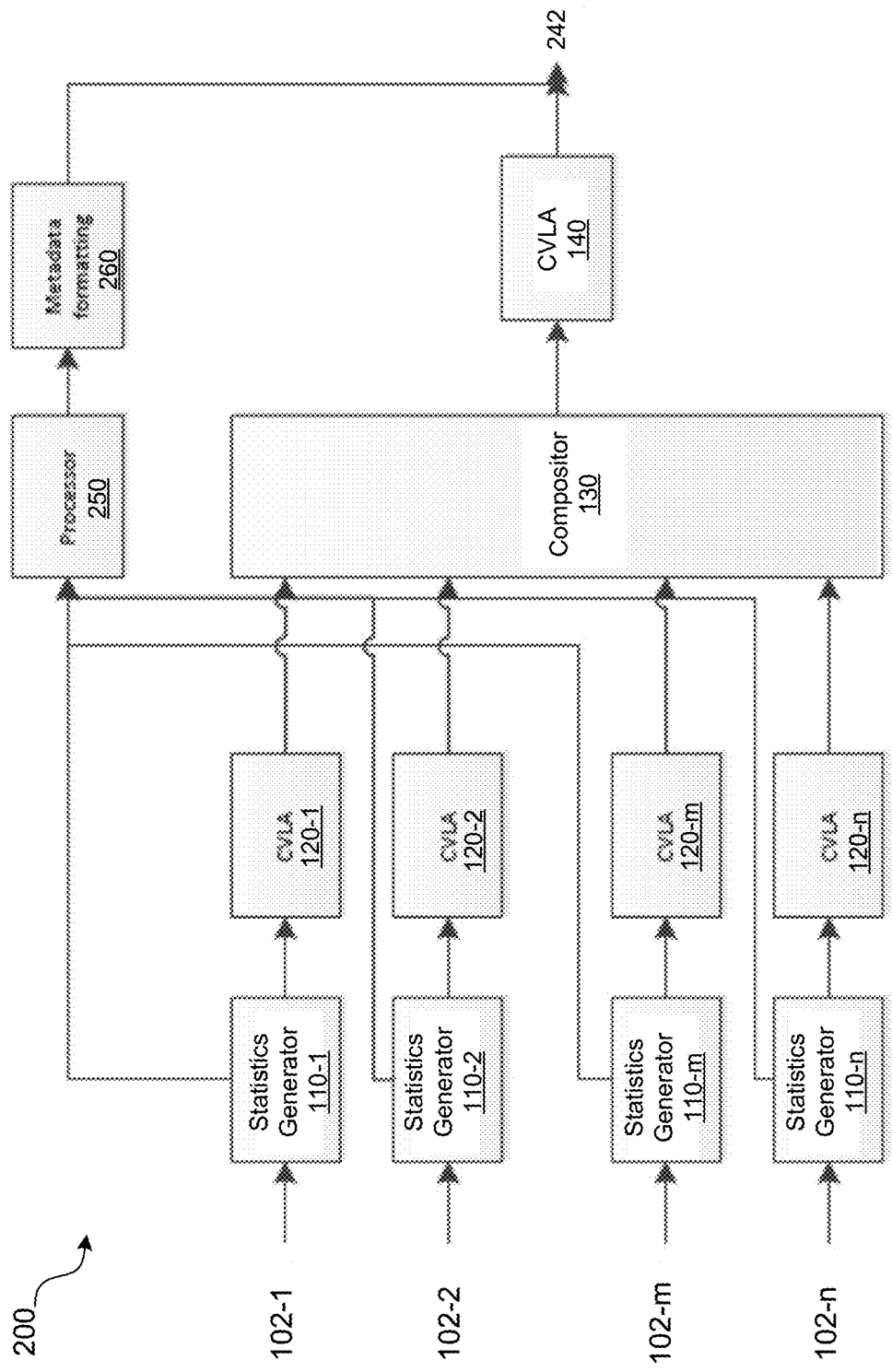
FIG. 2 is a high-level block diagram illustrating an example of a system with improved video rendering using statistics-based dynamic metadata, according to aspects of the subject technology.

FIG. 2 is a high-level block diagram illustrating an example of a system, such as a STB 200, with improved video rendering using statistics-based dynamic metadata, according to aspects of the subject technology. The STB 200 is similar to the STB 100 of FIG. 1, except that the STB 200 further includes the processor 250 and a metadata formatting block 260, as described herein. The statistics generators 110, the CVLA blocks 120, the compositor 130 and the CVLA block 140 are similar to the same blocks in the STB 100. The STB 200 has the additional capability of outputting to the display device video frames with corresponding dynamic metadata. In one or more implementations, the dynamic metadata is generated based on the statistics generated by the STB 200. For example, the processor 250 may receive statistics from the statistics generators 110 (e.g., 110-1 through 110-$n$). The statistics may include information (e.g., a histogram, a binned histogram, a 2D-histogram, a 3D-histogram, a minimum, a maximum, a sum, or an average) of one or more quantities such as luminance values, red (R), green (G) and blue (B) component values, a MAX (a*R, b*G, c*B) or a SUM (d*R, e*G, f*B) for each pixel of the respective input content 102, as described above. The dynamic metadata generated by the processor 250 can be formatted by the metadata formatting block 260 for better adapting to a format of the output device (e.g., a display or a decoder). The formatted metadata is provided along with the output video content of the CVLA block 140 to the output device such as a display device, as an output 242.

Figure 3:
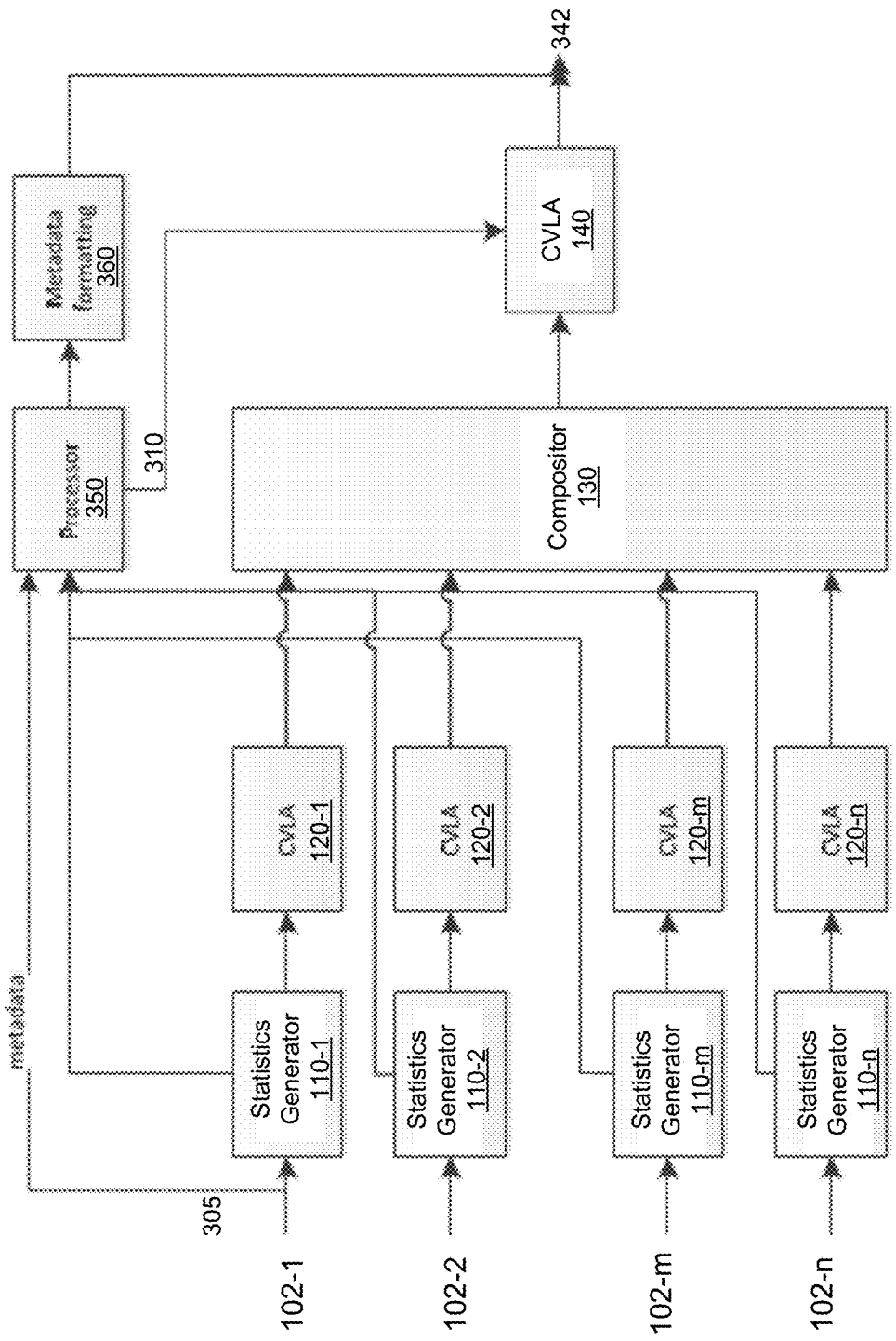
FIG. 3 is a high-level block diagram illustrating an example of a system with improved video rendering using input and statistics-based dynamic metadata, according to aspects of the subject technology.

FIG. 3 is a high-level block diagram illustrating an example of a system, such as a STB 300, with improved video rendering using input and statistics-based dynamic metadata, according to aspects of the subject technology. The STB 300 is similar to the STB 200 of FIG. 2, except that in the STB 300 the processor 350 further receives dynamic metadata from one of the input sources. The statistics generators 110, the CVLA blocks 120, the compositor 130, the CVLA block 140, the processor 250 and the metadata formatting block 260 are similar to the same blocks in the STB 200. The STB 300 receives input metadata 305 describing an input source, for example, the metadata from input video content 102-1, and statistics from statistics generators 110. This additional capability allows the processor 350 to modify input metadata 305 based on statistics generated from the input video content 102-1, as well as from other input video and graphics content (e.g., 102-2 through 102-$n$) from other sources. The modified metadata from the processor 350 is provided to the metadata formatting block 360 for format adaptation to the output device such as a display device. The processor 350 also provides the modified metadata 310 to the CVLA block 140. The CVLA block 140 may use the modified metadata 310 in some of its functionalities, for example, color space transformation described herein, to generate an output video 342.

Figure 4:
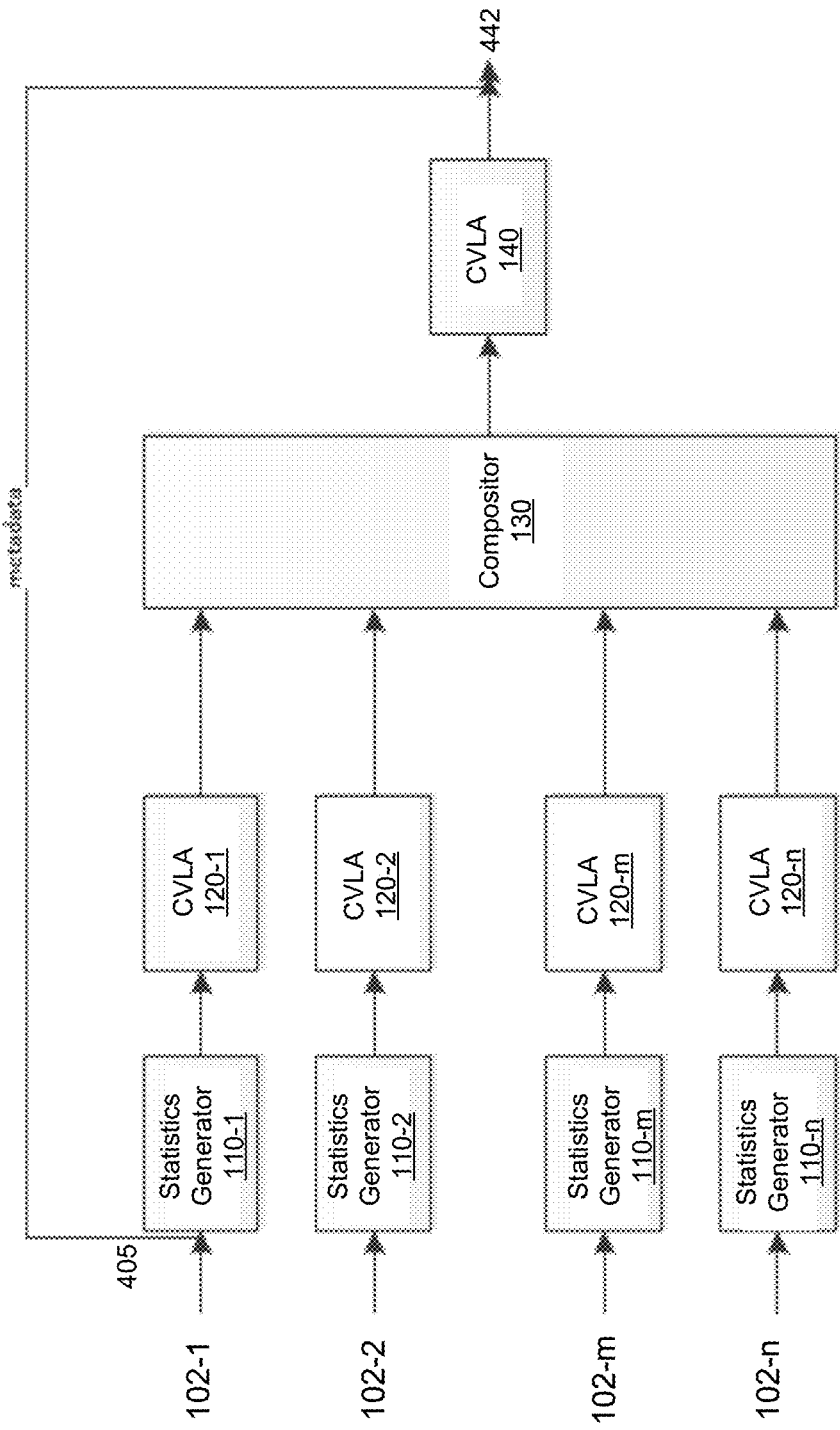
FIG. 4 is a high-level block diagram illustrating an example of a system with improved video rendering using input dynamic metadata, according to aspects of the subject technology.

FIG. 4 is a high-level block diagram illustrating an example of a system, such as a STB 400, with improved video rendering using input dynamic metadata, according to aspects of the subject technology. The STB 400 is similar to the STB 100 of FIG. 1, except that in the STB 400, metadata 405 from an input source is added to the output video, and the functionalities of different CVLA blocks 120 can be different as described herein. The statistics generators 110, the compositor 130 and the CVLA block 140 are similar to the same blocks in the STB 100. The STB 400 has the additional capability of outputting to the display device using dynamic metadata. However, the appearance of the composited video and graphics can be improved if the STB (e.g., STB 400) is designed with an understanding of how an output device such as a display device may use that dynamic metadata to map color values to the display.

It is understood that a portion of the dynamic metadata can be global and may affect all of the pixels in the raster equally, another portion of the dynamic metadata can be local and may only affect a selected number of the pixels in the raster. In the STB 400, that first input video content 102-1 includes dynamic metadata 405 that is directly provided to the output device. In some implementations, the first input adaptation block (e.g., CVLA block 120-1) is bypassed. In one or more implementations, the functionalities of other input adaptation blocks (e.g., CVLA blocks 120-2 through 120-$n$) includes performing an inverse function of an anticipated display processing of the dynamic metadata. The output device (e.g., a television or other display device) may use the static or dynamic metadata in a somewhat predictable way, so the domain(s) of the CVLA blocks 120-2 through 120-$n$ can be chosen to be an inverse of the expected processing, such that the final output 442 can more accurately represent the desired video content. A domain in the context of the present discussion can include a target brightness, a color volume, a white point or a color component representation.

Figure 5:
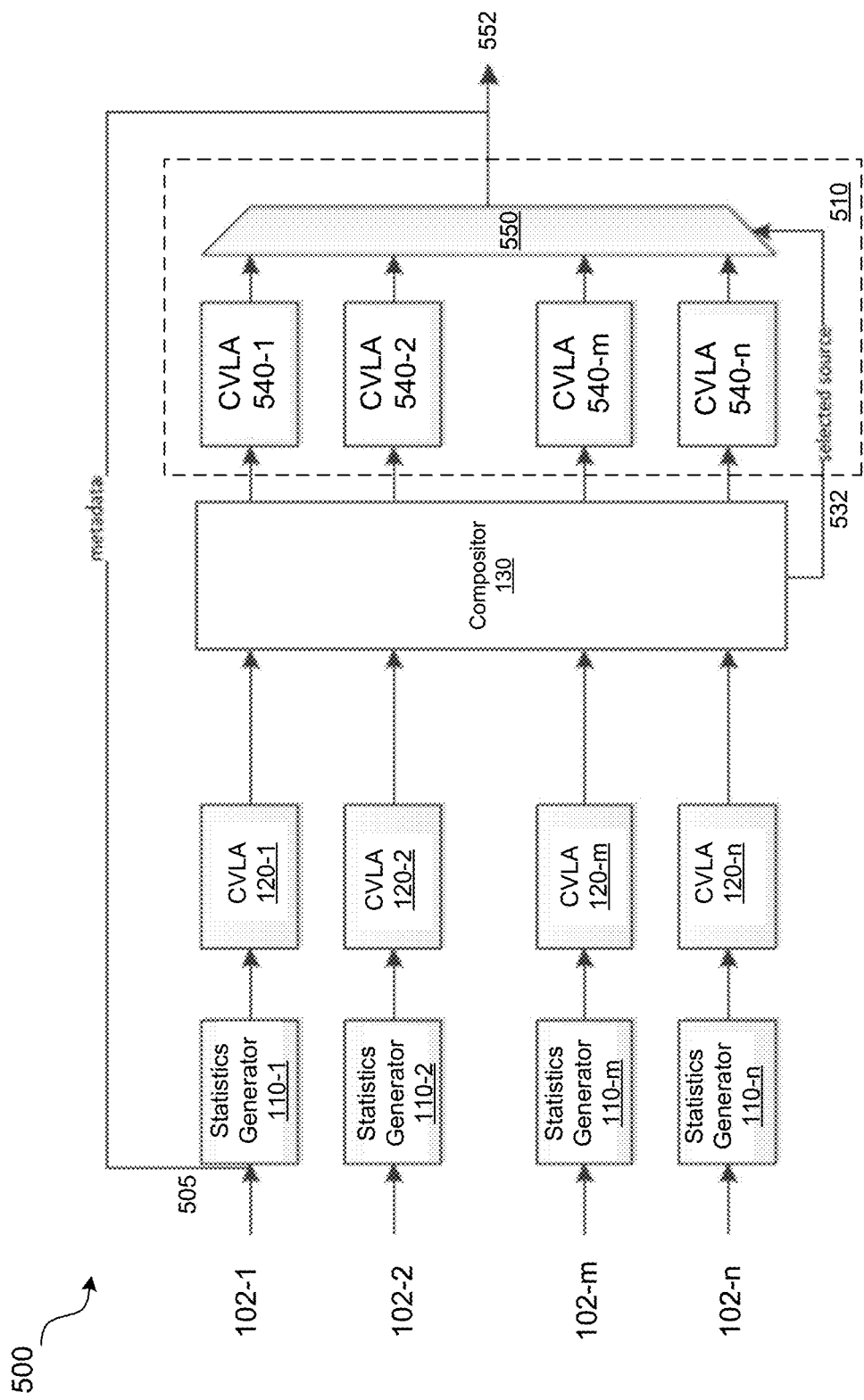
FIG. 5 is a block diagram illustrating an example of a system with improved video rendering using input dynamic metadata, according to aspects of the subject technology.

FIG. 5 is a block diagram illustrating an example of a system, such as a STB 500, with improved video rendering using input dynamic metadata, according to aspects of the subject technology. The STB 500 is similar to the STB 400 of FIG. 4, except that in the STB 500, the CVLA block 140 of FIG. 4 is replaced with an output adaptation block 510. The statistics generators 110, the CVLA block 120 and the compositor 130 are similar to the same blocks in FIG. 1, as described above. The output adaptation block 510 includes CVLA blocks 540 (e.g., 540-1 through 540-$n$) and a multiplexer (MUX) 550. The CVLA blocks 540 are generally similar to the CVLA blocks 140 of FIG. 1.

In one or more implementations, the CVLA block 540-1 corresponding to the first processing channel is bypassed and the CVLA blocks 540-2 through 540-$n$ further include performing an inverse function of an anticipated display processing of the dynamic metadata 505 included in the input video content 102-1 from the first source. The MUX 550 can pass an output video of a selected one of the CVLA blocks 540 to an output device (e.g., a display device or a decoder). In some implementations, the selection signal 532 for the MUX 550 is issued by the compositor 130. The selection signal 532 enables selection of one of the processing channels corresponding to a source that has the greatest contribution (e.g., largest alpha, largest pixel count, etc.) to the compositor's output signal. The dynamic metadata 505 is provided along with the output of the selected one of the CVLA blocks 540 as the final output video content 552.

Figure 6A:
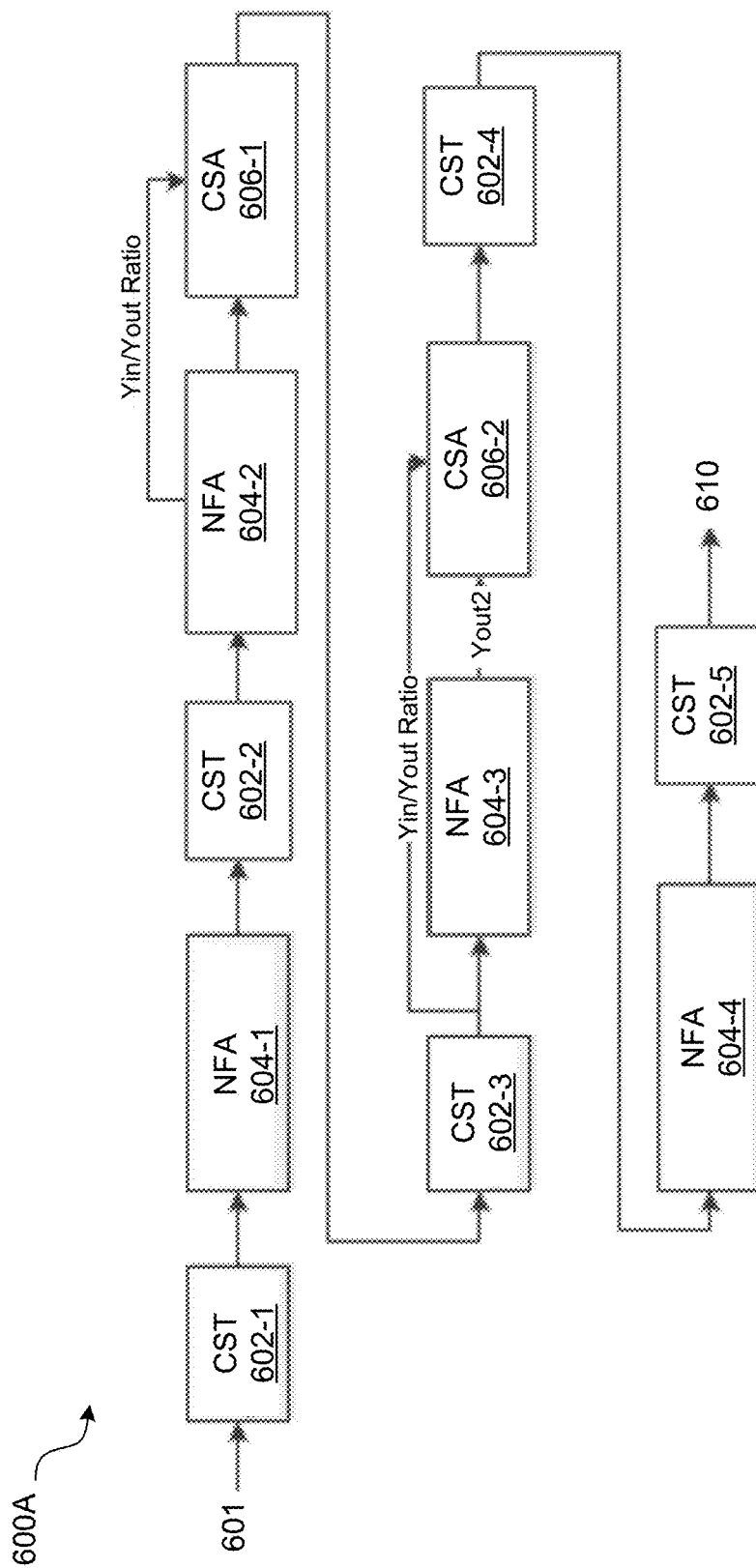
FIGS. 6A-6B are flow diagrams illustrating examples of programing flows of a color volume and luminance adaptation (CVLA) block, according to aspects of the subject technology.
Figure 6B:
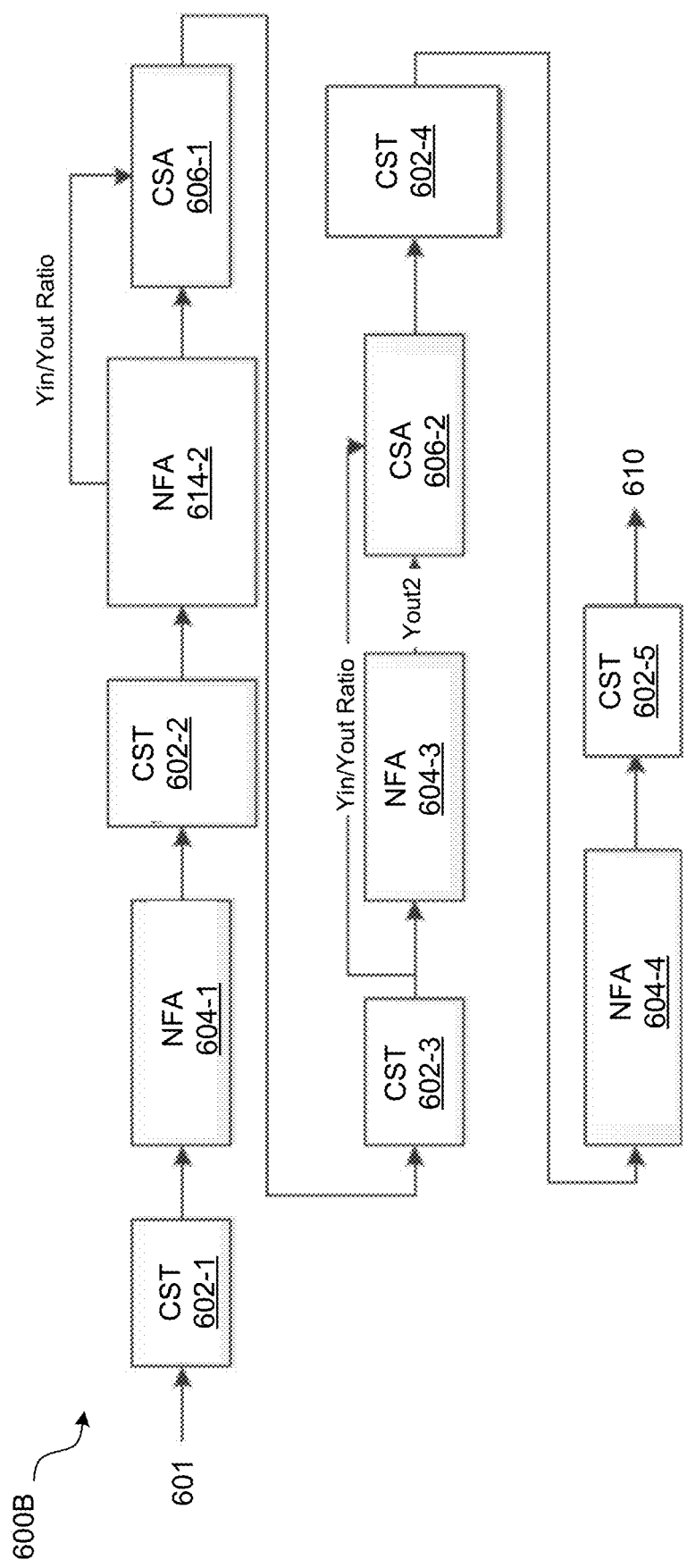

FIGS. 6A-6B are flow diagrams illustrating examples of programing flows 600A and 600B of a color volume and luminance adaptation (CVLA) block, according to aspects of the subject technology. Each of the CVLA blocks 120 and 140 of FIGS. 1-4 may in general follow the programing flows 600A or 600B. The programing flow 600A includes multiple color saturation transformation (CST) blocks 602 (e.g., 602-1 through 602-5), a number of non-linear function application (NFA) blocks 604 (e.g., 604-1 through 604-4) and color saturation adjustment (CSA) blocks (e.g., 606-1 and 606-2). It is understood that the non-linear functions may also include linear functions as a subset thereof. The input 601 of the programing flows 600A can be an output of the statistics generator 110 or the compositor 130 of FIG. 1. In some implementations, the input 601 can be SDR video content. The input 601 is provided to the CST block 602-1. The CST blocks 602-1 may perform color space transformation to (or from) a luminance/color difference representation from (or to) another set of primaries, for example, mastering display primaries, BT.2020 primaries and DCI-P3 primaries as defined in the Society of Motion Picture And Television Engineers (SMPTE) RP 431-2, or other primaries. In some implementations, the color space transformation may be implemented using a matrix multiplication and/or a color-clipping or color-compression function. In one or more implementations, the CST block 602-1 may perform one or more color space transformations, for example, from YCbCr to RGB. The output of the CST block 602-1 is passed to the NFA block 604-1.

At the NFA blocks 604, a nonlinear function may be applied to the luminance to remove the source transfer function and/or previously applied perceptual transfer functions (e.g., optical-to-optical transfer function (OOTF), gamma, etc.). In some implementations, the NFA block 604-1 removes the ST. 2084 electrical-to-optical transfer function (EOTF). The output of the NFA block 604-1 is provided to the CST 602-2, which can apply a further color space transformation to another set of primaries (for example, BT.2020 primaries, DCI-P3 primaries, display primaries, etc.). The color transformed output of the CST 602-2 is passed to the NFA block 604-2. The NFA block 604-2 may apply a nonlinear function, for example, to invert the anticipated effects of subsequent display processing, such as the anticipated luminance effects of dynamic metadata, the brightness-limiting knee function in the display and another subsequent display processing. The application of the nonlinear function by the NFA block 604-2 can improve the perceived quality of the output, such as a global or local tone mapping operator that improves the look of the video or graphics content.

At CSA block 606-1, a color saturation adjustment may be optionally applied. The color saturation adjustment performed by the CSA block 606-1 may, for example, invert the anticipated color effects of the dynamic metadata, to improve the perceived colors of the output video content. The CSA block 606-1 may also receive a parameter such as a Yin/Yout ratio from the NFA block 604-2. In some implementations, the output of the CSA block 606-1 is not processed by a CST block 602-3, the NFA block 604-3 and CSA block 606-2 (which are bypassed) and is passed to the CST block 602-4, in which one or more color space transformation, for example, from mastering to DCI P3 color space can take place.

The NFA block 604-4 may apply a nonlinear function to convert pixel values to a standard signal format, for example, based on ITU-T Recommendation BT.709, BT.2100 Perceptual Quantization, BT.2100 Hybrid Log-Gamma, or other nonlinear format. In some implementations, the NFA block 604-4 can apply a nonlinear function to convert pixel values to the signal format of ST.2084 by an inverse EOTF. In some implementations, the output of the NFA block 604-4 is provided as the output 610 of the program flow 600A and the CST block 606-5 is bypassed.

The programing flow 600B is similar to the programing flow 600A, except that the NFA block 604-2 of the programing flow 600A is replaced by a NFA block 614-2. The NFA block 614-2 can apply a nonlinear function, which is a tone-mapping function parameterized by the collected input statistics provided by the statistics generators 110 of FIG. 1 or the input dynamic metadata from input streams 102. The tone mapping curve parameterized by the collected input statistics can target a specific brightness (e.g., 1000 nits, the display's peak brightness, the expected peak brightness signal level that the display expects to receive, etc.).

Figure 7:
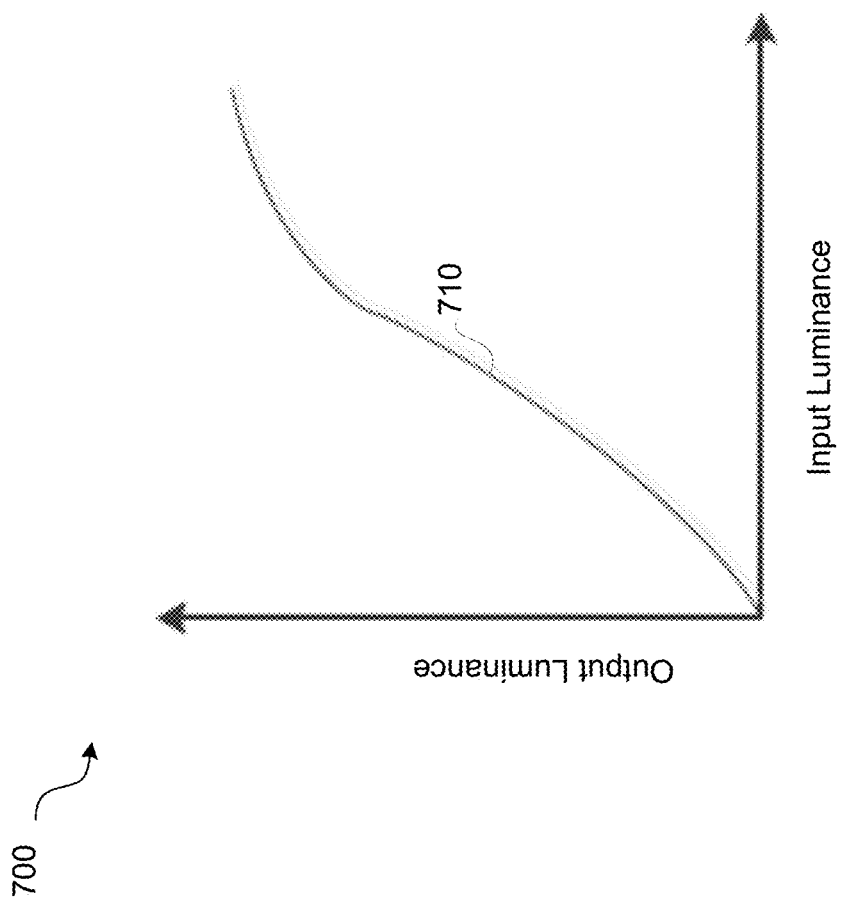
FIG. 7 is a chart illustrating an example of a nonlinear luminance mapping function.

FIG. 7 is a chart illustrating an example of a plot 700 of a nonlinear luminance mapping function 710. The nonlinear luminance mapping function 710 shows variation of output luminance versus input luminance, which start with a rising slope and ends with saturation as certain level of input luminance. The nonlinear luminance mapping function 710 is an example of the nonlinear functions used by the NFA blocks 604 of FIGS. 6A and 6B.

Figure 8:
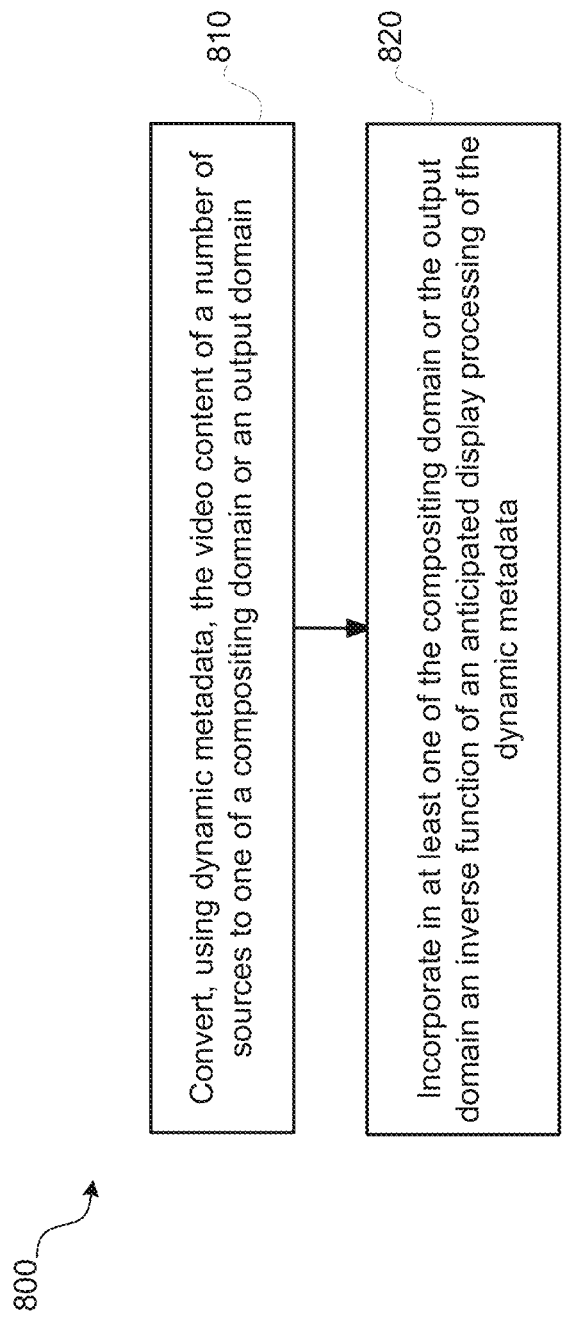
FIG. 8 is a flow diagram illustrating an example method of improved rendering of video content of a number of sources, according to aspects of the subject technology.

FIG. 8 is a flow diagram illustrating an example method 800 of improved rendering of video content of a number of sources, according to aspects of the subject technology. The method 800 includes converting, using dynamic metadata (e.g., 105 of FIG. 3), the video content (e.g., 102 of FIG. 3) of a number of sources to one of a compositing domain (e.g., related to 110, 120 and 130 of FIG. 1) or an output domain (e.g., related to 342 of FIG. 3) (810). A domain in the context of the present discussion can include a target brightness, a color volume, a white point or a color component representation. The method 800 further includes incorporating in at least one of the compositing domain or the output domain an approximate inverse function (e.g., by NFA 604 of FIG. 6A) of an anticipated display processing that can possibly be performed on the dynamic metadata (820). Using the dynamic metadata includes directly using, in some embodiments (e.g., as in FIG. 4), or modifying, in other embodiments (e.g., as in FIGS. 2 and 3), dynamic metadata of one or more selected sources. The compositing domain can be associated with a compositor and the output domain can be associated with an output adaptation circuit or block (e.g., 140 of FIG. 1). The converting can be performed by a number of processing channels, and each processing channel can include a statistics generator circuit (e.g., 110 of FIG. 1) and an input adaptation circuit (e.g., 120 of FIG. 1).

Figure 9:
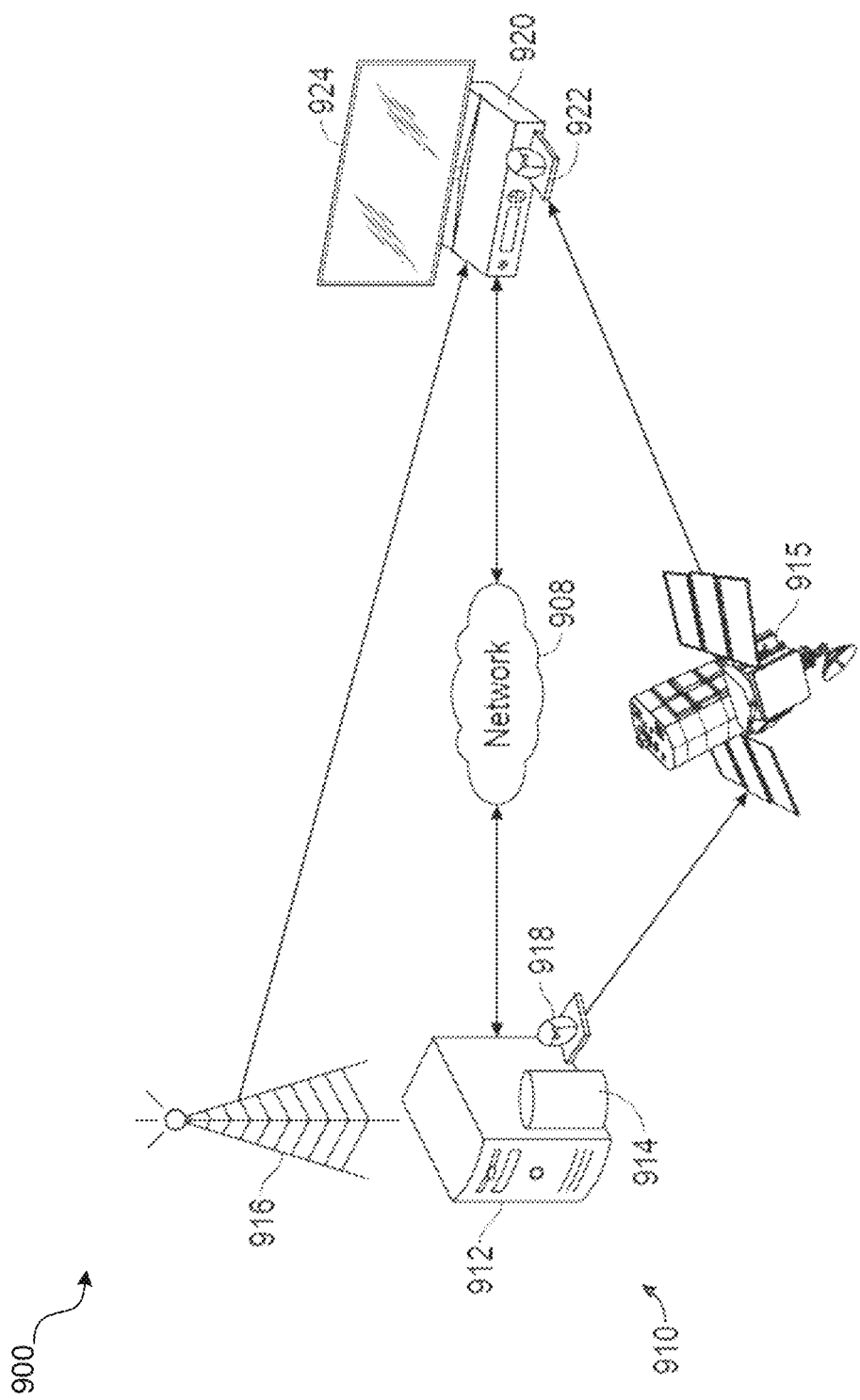
FIG. 9 is a block diagram illustrating an example environment, in which the improved video rendering of the subject technology is implemented.

FIG. 9 illustrates an example network environment 900 in which a video rendering system may be implemented, according to aspects of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 900 includes a content delivery network (CDN) 910 that is communicably coupled to an electronic device 920, such as by a network 908. The CDN 910 may include, and/or may be communicably coupled to, a content server 912 for encoding and/or transmitting encoded data streams, such as HEVC encoded video streams, AV1 encoded video streams, and/or H.266 encoded video streams, over the network 908, an antenna 916 for transmitting encoded data streams over the air, and a satellite transmitting device 918 for transmitting encoded data streams to a satellite 915.

The electronic device 920 may include, and/or may be coupled to, a satellite receiving device 922, such as a satellite dish, that receives encoded data streams from the satellite 915. In one or more implementations, the electronic device 920 may further include an antenna for receiving encoded data streams, such as encoded video streams, over the air from the antenna 916 of the CDN 910. The content server 912 and/or the electronic device 920, may be, or may include, one or more components of the electronic system discussed below with respect to FIG. 10.

The network 908 may be a public communication network (such as the Internet, cellular data network, dialup modems over a telephone network) or a private communications network (such as private local area network ("LAN"), leased lines). The network 908 may also include, but is not limited to, any one or more of the following network topologies, including a bus network, a star network, a ring network, a mesh network, a star-bus network, a tree or hierarchical network, and the like. In one or more implementations, the network 908 may include transmission lines, such as coaxial transmission lines, fiber optic transmission lines, or generally any transmission lines, that communicatively couple the content server 912 and the electronic device 920.

The content server 912 may include, or may be coupled to, one or more processing devices, a data store 914, and/or an encoder. The one or more processing devices execute computer instructions stored in the data store 914, for example, to implement a content delivery network. The data store 914 may store the computer instructions on a non-transitory computer-readable medium. The data store 914 may further store one or more programs, e.g. video and/or audio streams that are delivered by the CDN 910. The encoder may use a codec to encode video streams, such as an HEVC codec, an AV1 codec, an H.266 codec, or any other suitable codec.

In one or more implementations, the content server 912 may be a single computing device such as a computer server. Alternatively, the content server 912 may represent multiple computing devices that are working together to perform the actions of a server computer (such as a cloud of computers and/or a distributed system). The content server 912 may be coupled with various databases, storage services, or other computing devices, such as an adaptive bit rate (ABR) server, that may be collocated with the content server 912 or may be disparately located from the content server 912.

The electronic device 920 may include, or may be coupled to, one or more processing devices, a memory, and/or a decoder, such as a hardware decoder. The electronic device 920 may be any device that is capable of decoding an encoded data stream, such as an encoded video stream. In one or more implementations, the decoder may implement one or more of the decoding techniques described below.

In one or more implementations, the electronic device 920 may be, or may include all or part of, a laptop or desktop computer, a smartphone, a tablet device, a wearable electronic device, such as a pair of glasses or a watch with one or more processors coupled thereto and/or embedded therein, a set-top box, a television or other display with one or more processors coupled thereto and/or embedded therein, or other appropriate electronic devices that can be used to decode an encoded data stream, such as an encoded video stream.

In FIG. 9, the electronic device 920 is depicted as a set-top box, e.g. a device that is coupled to, and is capable of displaying video content on, a display 924, such as a television, a monitor, or any device capable of displaying video content. In one or more implementations, the electronic device 920 may be integrated into the display 924 and/or the display 924 may be capable of outputting audio content in addition to video content. The electronic device 920 may receive streams from the CDN 910, such as encoded data streams, that include content items, such as television programs, movies, or generally any content items. The electronic device 920 may receive the encoded data streams from the CDN 910 via the antenna 916, via the network 908, and/or via the satellite 915, and decode the encoded data streams, e.g. using the hardware decoder. In one or more implementations, the electronic device 920 may implement one or more of the video rendering techniques for displaying video content on a display 924, as is described further herein.

For example, when a set-top box or a similar type of terminal device, such as the electronic device 920, receives video data and outputs the video data to a display device, such as the display 924, the video data may be processed to adapt content of the video data to the capabilities of the display. Such adaptation may be performed using color volume and luminance adaptation (CVLA). To improve the adaptation to the display, the CVLA processing may be performed to apply a nonlinear function and/or tone mapping to the video data before outputting the video data to the display. The nonlinear function may be applied to adjust various display characteristics of the video data. In one or more implementations, static tone mapping or dynamic tone mapping may be applied to adjust various display characteristics of the video data. In one or more implementations, the nonlinear function is applied to each component. In one or more implementations, the nonlinear function is a nonlinear function related to luminance to remove at least one of a source transfer function or a previously applied perceptual transfer function, or to apply a color saturation adjustment. In one or more implementations, the nonlinear function is a nonlinear transfer function that remaps one or more luminance values to account for a difference between source-referred pixel values and scene-referred linear pixel values. In one or more implementations, the nonlinear function is a nonlinear function to perform at least one of: inverting anticipated effects of subsequent display processing, or applying a color saturation adjustment.

In one or more implementations, the video data includes video data from multiple video sources and the video data is processed further by combining the video data into a single output video data using a compositing function. The video data is processed by performing CVLA processing on each of the video data and performing CVLA processing on the single output video data.

In one or more implementations, the electronic device 920 may process the video data by performing tone mapping that is static tone mapping to map one or more input color values for the video data to one or more output color values for display, respectively. The one or more input color values are scene-referred or display-referred. In one or more implementations, the tone mapping includes converting a format of the video data to a standard signal format. In one or more implementations, the converting the format of the video data to the standard signal format is performed using dynamic metadata. In one or more implementations, the tone mapping includes adjusting a brightness level of the video data based on picture characteristics. In one or more implementations, the output processed video data is pre-distorted to reduce effects of a brightness-limiting knee function and a color compression of the display. In one or more implementations, the tone mapping includes providing the display with an indication that the video content has been adapted one or more video characteristics, the one or more video characteristics including at least one of primaries, a white point, or a display brightness profile.

In one or more implementations, the tone mapping includes providing for the display mastering metadata that indicates at least one of mastering display primaries, peak luminance, or content characteristics used in creation of the video data. In one or more implementations, the mastering metadata is used to determine a target brightness level for the composited graphics and/or video. In one or more implementations, the content characteristics within the mastering metadata is modified to match the content characteristics of the result of the combining the video data.

In one or more implementations, the electronic device 920 may process the video data by performing tone mapping that is dynamic tone mapping using dynamic metadata to map one or more input color values for the video data to one or more output color values for display, respectively. In one or more implementations, the tone mapping includes providing for the display dynamic metadata from the video data. In one or more implementations, the dynamic metadata is modified to account for characteristics of composited video data and/or the dynamic metadata is modified before being sent to the display. In one or more implementations, the dynamic metadata is modified to indicate to the display to apply an alternate tone mapping to regions of the video data where video content or graphic content is present.

In one or more implementations, the processing of the video data includes computing statistics on the video sources and generating values for the dynamic metadata based on the computed statistics. In one or more implementations, the statistics are computed before combining the video data. In one or more implementations, the statistics are computed based on the output video data before being provided to the display. In one or more implementations, the statistics are computed based on the output video, to be applied to subsequent output video data.

Figure 10:
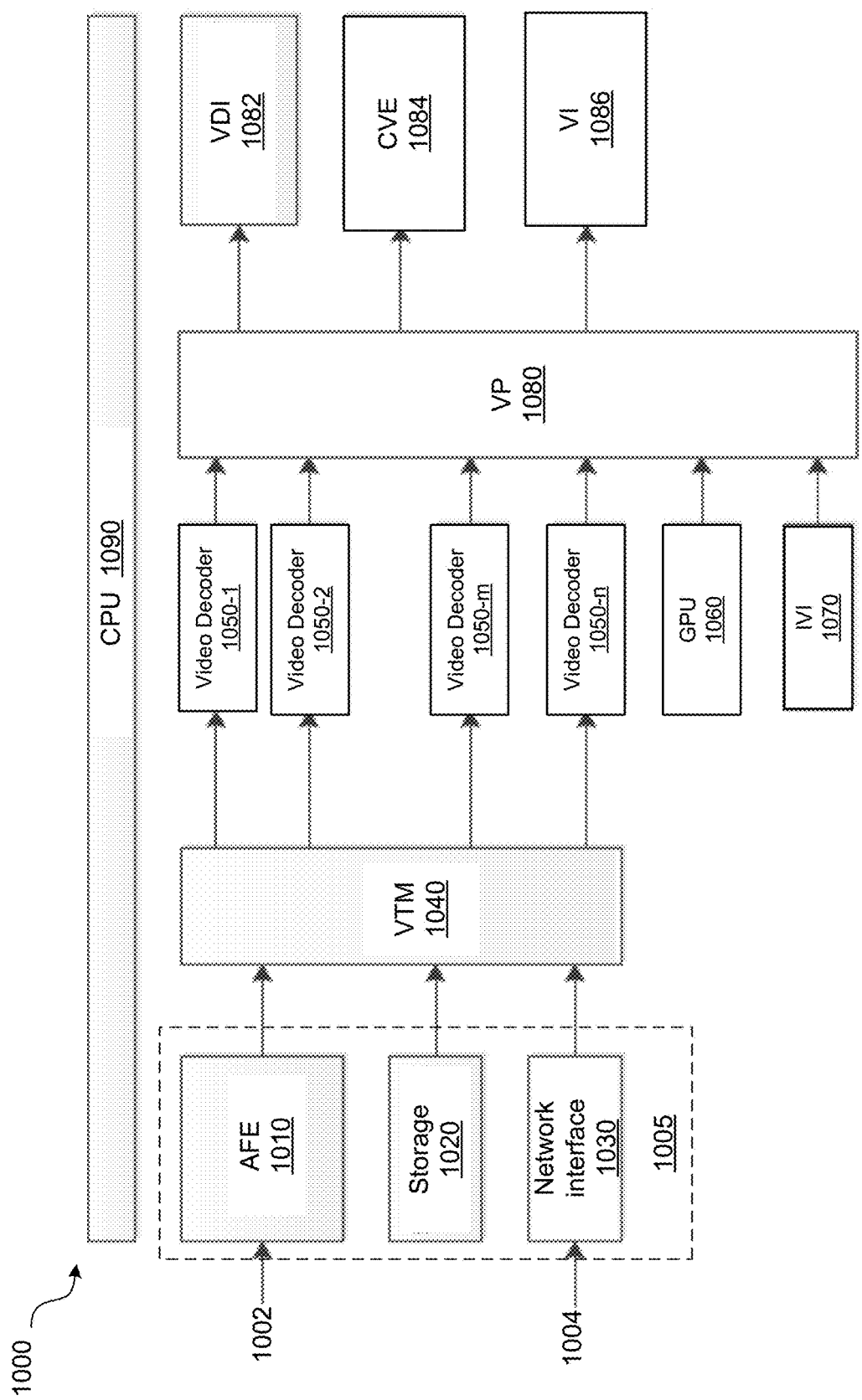
FIG. 10 is a block diagram illustrating an example system architecture of a system, in which the improved video rendering of the subject technology is implemented.

FIG. 10 is a block diagram illustrating an example system architecture of a system, such as a STB 1000, in which the improved video rendering of the subject technology is implemented. The STB 1000 includes input content sources 1005, a video transport manager (VTM) 1040, a number of video decoders 1050 (1050-1 through 1050-n), a graphics processing unit (GPU) 1060, other input video interfaces (IVI) 1070, a video processor (VP) 1080, a video display interface (VDI) 1082, a compressed video encoder (CVE) 1084 and other video interfaces (VI) 1086. The input content sources 1005 includes, for example, an analog front-end (AFE) 1010 (e.g., including one or more tuner(s) and/or demodulator(s)), which receives an input content 1002, a storage 1020 (e.g., a hard disk drive (HDD), a flash memory or other memory types) and a network interface 1030 (e.g., Ethernet, Wi-Fi, and/or other networks), which receives an input content 1004. The VTM 1040 is responsible for transferring input video content from video content sources 1005 and manage transferring them to the video decoders 1050 for decoding. The video processor 1080 receives video and graphics content from the video decoders 1050, GPU 1060 and IVI 1070. The IVI 1070 includes input video interfaces such as high-definition multimedia interface (HDMI). The processing of the video content as described above with respect to FIGS. 1 through 6B are performed by the VP 1080. Among processing steps performed by the VP 1080 are static and dynamic tone mapping as mentioned above and described in more detail herein.

In some scenarios, a display can be placed into a mode where it is performing a static tone mapping, that is, a particular input color value is mapped to a specific output color value on the display. The rendering of the output color may be consistent, or the rendering may vary on certain types of displays (e.g., TV's) due to dynamic contrast, hue/saturation/color adjustment or stretching, dynamic backlight adjustment or other adjustments. The input color value may be scene-referred or display-referred. In one or more embodiments, a STB (e.g., 1000) converts video and graphics to standard signal format (e.g., ITU-T Recommendation BT.709, BT.2100 Perceptual Quantization, BT.2100 Hybrid Log-Gamma, etc.). In these cases, CVLA (e.g., 120 of FIG. 1) involving color transformation, luminance remapping, and/or saturation adjustment may be applied to the video content when such video content is not available in the chosen standard format. Some types of graphics (e.g., those with a limited dynamic range, subtitles, closed captions, etc.) and some types of video content (e.g., SDR video) might be adjusted to be brighter or dimmer so they are comfortably viewed when composited with HB, low brightness, and/or HDR video content. This adjustment may be performed in response to either global or local picture characteristics, such as average or peak brightness or luminance. In some embodiments, the output video is pre-distorted to reduce the effects of the brightness-limiting knee function and color compression of the display if known.

In one or more embodiments, the VP 1080 provides, via the VDI 1082, a display with mastering metadata (e.g., the metadata defined in SMPTE ST.2086, the MaxCLL and/or MaxFALL metadata defined in Annex P of CTA 861-G, etc.) that indicates the mastering display primaries, peak luminance, content characteristics, etc., that was used in the creation of the video content. CVLA may be used to adapt other graphics and/or video sources to the mastering display color volume. In some embodiments, the mastering metadata is modified (e.g., to a color volume that circumscribes all of the composited sources' color volumes, to the expected peak brightness of the display, etc.) by the VP 1080 and CVLA is applied as needed to all composited graphics and/or video. In one or more embodiments, the mastering metadata is used to determine a target brightness level for the composited graphics and/or video. In some embodiments, metadata that describes the content characteristics is modified to match the content characteristics of the result of the compositing operation in the VP 1080.

In one or more embodiments, the VP 1080 provides the display with an indication that the video content has been adapted to the primaries that are indicated in its capabilities (e.g., VESA EDID, VESA DisplayID, retrieve capability information from a database of displays, etc.). This indication is not yet standardized, but the signaling method may be standardized in the future or may be vendor-specific. The CVLA may be used to adapt graphics and/or video sources to this color volume.

In one or more embodiments, the VP 1080 provides the display with an indication that the video content has been adapted to the DCI-P3 primaries and white point (e.g., SMPTE RP 431-2). The CVLA may be used to adapt graphics and/or video sources to this color volume. In one or more embodiments, the VP 1080 provides the display with an indication that the video content has been adapted to the display brightness profile. The display brightness profile or peak brightness may be signaled to the STB using a standards-based signaling method or vendor-specific implementation. The brightness profile or peak brightness may be a scalar or it may consist of multiple quantities (e.g., a function or indication of how the peak brightness varies as a function of video content characteristics).

In one or more embodiment, the VP 1080 uses dynamic metadata (e.g., metadata as defined in SMPTE ST.2094-10, ST.2094-20, ST.2094-30, ST2094-40; global tone mapping or luminance adjustment; local tone mapping or luminance adjustment; global or local color saturation adjustment; etc.) to convert video content to one of the static formats specified above. CVLA may be used to do this conversion.

In some embodiments, the VP 1080 performs the compositing of video and/or graphics sources in one of the static formats specified above. In one or more embodiments, the VP 1080 performs the compositing of video and/or graphics in a different, common static format and CVLA may be used to convert to the output format.

In some scenarios, it may be desirable to output to the display using dynamic metadata. The appearance of composited video and graphics can be improved if the VP 1080 has some ways of understanding of how a display device might use that dynamic metadata to map color values to the display. Some dynamic metadata are global and can affect all of the pixels in the raster equally, and some dynamic metadata are local and can only affect some of the pixels in the raster.

In one or more embodiments, the VP 1080 provides the display with dynamic metadata (for example, as defined in CTA 861-G) from the video content. The STB may adapt composited graphics and video content to a comfortable viewing level using CVLA or brightness adjustment. This adjustment may be performed in response to global or local picture characteristics, such as average or peak brightness or luminance. This adjustment may be performed in response to one or more values of dynamic metadata elements.

In some embodiments, the VP 1080 can provide the display device with dynamic metadata (for example, as defined in CTA 861-G) that is based on video content but modified to account for the characteristics of composited graphics and video. In one or more embodiments, the VP 1080 may alter the dynamic metadata before it is sent to the display in order to apply a different or static tone mapping to the entire video raster. The VP 1080 may utilize the source dynamic metadata to convert the source video to a known format and use CVLA to adapt the result to the anticipated modified dynamic or static tone mapping. In one or more embodiments, the VP 1080 alters the dynamic metadata to tell the display to apply an alternate tone mapping to only the regions where video and/or graphics are present. In one or more embodiments, the VP1080 may adapt composited graphics and video content to a comfortable viewing level using CVLA or brightness adjustment. This adaptation may be based on global or local pixel statistics or based on the incoming dynamic metadata. In one or more embodiments, the VP1080 may convert all composited video and graphics sources to a common format and use CVLA (and possibly other processing) to invert the anticipated effect of the dynamic metadata, which may come in whole or in part from the source video or may be another dynamic metadata set for which the effects are known.

In some embodiments, the VP1080 receives primary video content that has associated dynamic metadata. The inverse function of the anticipated effect of the dynamic metadata may be determined. The VP1080 may apply the inverse function to graphics, video without dynamic metadata, and/or video with dynamic metadata for which the dynamic metadata has already been applied. The inverse-processed graphics and/or video may be composited with the primary video, optionally using alpha blending. In one or more embodiments, the VP1080 computes statistics on the video and/or graphics sources, and uses those statistics to populate the values of the dynamic metadata.

Figure 11:
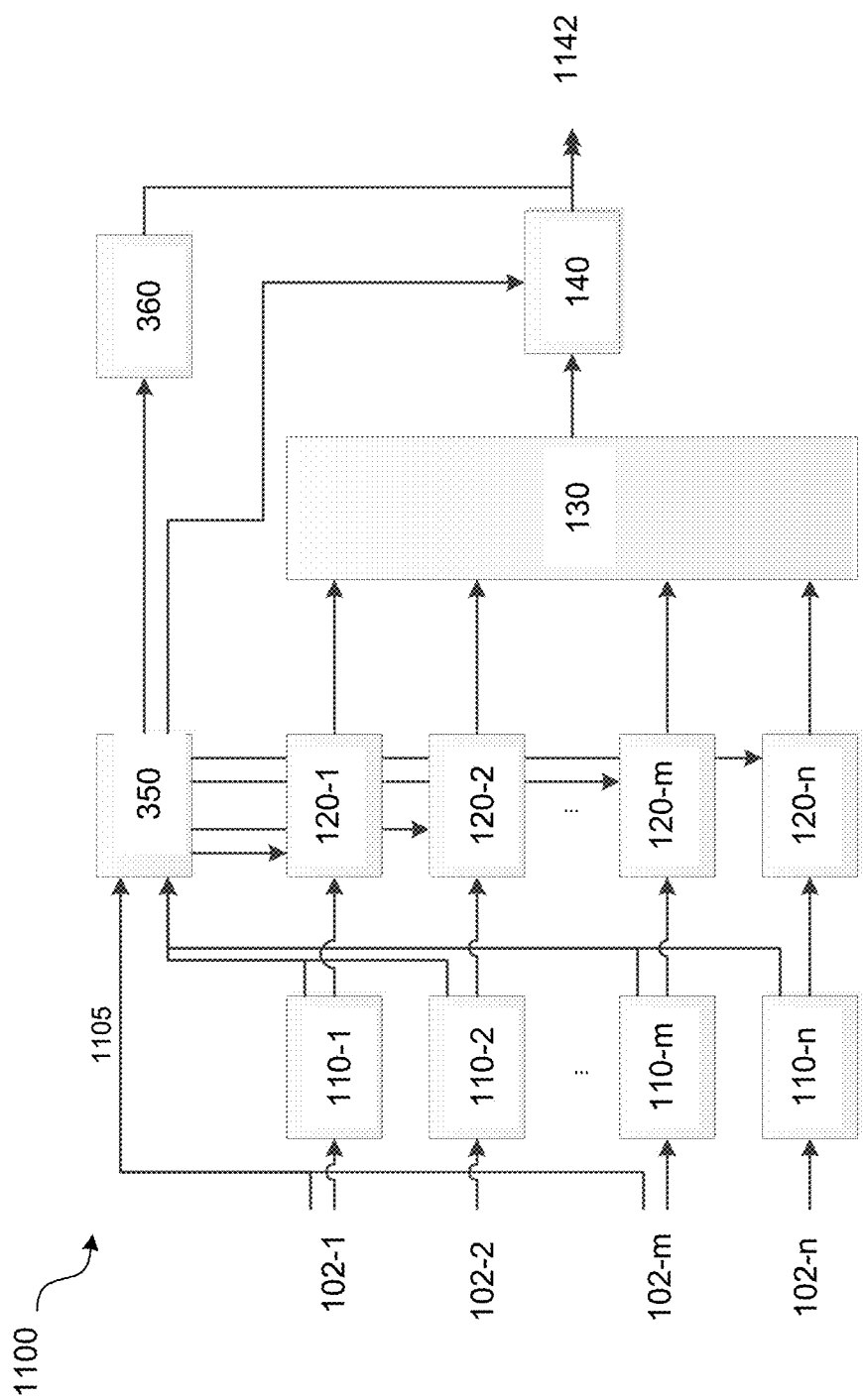
FIG. 11 is a block diagram illustrating an example of a system with improved video rendering using inputs and statistics-based dynamic metadata, according to aspects of the subject technology.

FIG. 11 is a block diagram illustrating an example of a system, such as a STB 1100, with improved video rendering using inputs and statistics-based dynamic metadata, according to aspects of the subject technology. The STB 1100 is similar to the STB 300 of FIG. 3, except for addition metadata inputs, for example, a metadata input from the input video content 102*m* to the processor 350, and control outputs from the processor 350 to the input CVLA blocks 120. The STB 1100 sums up the general case where a combination of metadata and statistics from more than one input video and graphics stream is used by the processor 350 to determine the individual configuration for each input CVLA block 120 and the output CVLA 140. The processor 350 can also send a collective metadata 1105 to the metadata formatting block 360. The formatted metadata is finally outputted along with the output video as a combined output 1142.

In some embodiments, the configuration of the STB 1100 allows choosing a common compositing domain based on the entire available information from the input video and graphics streams, and separately, to further target an output domain should it differ from the compositing domain. Based on the chosen compositing domain, each input video or graphics stream may require a different configuration of its CVLA block that is influenced dynamically by metadata (when present) and the computed statistics.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An apparatus, comprising:
a plurality of processing channels arranged in parallel and configured to receive a plurality of input content to process the plurality of input content received in parallel, wherein each of two or more processing channels of the plurality of processing channels comprises a statistics generator circuit coupled to an input adaptation circuit in series, wherein for each of the two or more processing channels of the plurality of processing channels:
the respective statistics generator circuit is configured to receive the respective input content and to compute statistics based on a luma representation or a luma difference representation before the respective input adaptation circuit receives and processes the respective input content; and
the respective input adaptation circuit is configured to adapt the respective input content to a first format based on the computed statistics, wherein the first format is a common format for all of the plurality of input content;
a compositor circuit coupled to outputs of the input adaptation circuits and configured to generate a single composite output signal; and
an output adaptation circuit coupled to the compositor circuit and configured to adapt the single composite output signal to a second format,
wherein the statistics computed by the statistics generator circuits includes a histogram,
wherein the statistics generator circuits are separate from the input adaptation circuits,
wherein the statistic generator circuits are arranged in parallel and configured to process their respective input content received in parallel, and
wherein the input adaptation circuits are arranged in parallel and configured to process their respective input content received in parallel.

2. The apparatus of claim 1,
wherein the plurality of input content comprises input video content and input graphics content,
wherein one dedicated channel of the plurality of processing channels is dedicated to receive the input graphics content but not the input video content,
wherein the one dedicated channel comprises a dedicated statistics generator circuit coupled to a dedicated input adaptation circuit in series to allow the dedicated statistics generator circuit to process the input graphics content before the dedicated input adaptation circuit processes the input graphics content,
wherein the input adaptation circuits, including the dedicated input adaptation circuit, comprise a color volume and luminance adaptation (CVLA) block, and wherein CVLA blocks of different processing channels of the plurality of processing channels are configured differently,
wherein the CVLA blocks of the processing channel for the dedicated input adaptation circuit is configured differently from the CVLA blocks of the other processing channels, and
wherein the apparatus comprises a display device or comprises a set-top box communicatively coupled to the display device.

3. The apparatus of claim 1, wherein the histogram is one of a binned histogram, a 2D-histogram, and a 3D-histogram, and wherein the statistics also includes at least one of a minimum, a maximum, a sum, or an average of one or more quantities.

4. The apparatus of claim 3, wherein the one or more quantities include, luminance values, red (R), green (G) and blue (B) component values, a MAX (a*R, b*G, c*B) or a SUM (d*R, e*G, f*B) for each pixel of the respective input content, where a, b, c, d, e, and f are constant values and MAX and SUM represent maximum and sum functions, respectively.

5. The apparatus of claim 1, wherein the statistics generator circuits are configured to compute the statistics based on a color difference representation.

6. The apparatus of claim 1, wherein the input adaptation circuits comprise a color volume and luminance adaptation (CVLA) block, and wherein CVLA blocks of different processing channels of the plurality of processing channels are configured differently.

7. The apparatus of claim 1, wherein the input adaptation circuits comprise a color volume and luminance adaptation (CVLA) block, wherein the CVLA block comprises a plurality of non-linearity and color space transformation hardware (HW) modules controlled by a processor, and wherein the CVLA block is configured to perform volume transformation and static and dynamic tone mapping.

8. The apparatus of claim 1, wherein at least one of the input adaptation circuits is configured to perform dynamic tone mapping based on dynamic metadata included in one or more of the plurality of input content or based on an analysis of possible changes in regions of the plurality of input content.

9. The apparatus of claim 1, wherein the output adaptation circuit is configured to receive dynamic metadata and to adapt the single composite output signal along with the dynamic metadata for display by a display device, and wherein the output adaptation circuit is configured to adapt the single composite output signal for display by adapting at least one of a luminance or a color property of the single composite output signal.

10. The apparatus of claim 1, comprising a processor configured to generate dynamic metadata based on the statistics generated by at least one of the statistics generator circuits, and comprising a metadata formatting circuit configured to format the dynamic metadata for use by a display device,
wherein the processor and the metadata formatting circuit are separate from the statistics generator circuits, the input adaptation circuits, the compositor circuit, and the output adaptation circuit.

11. The apparatus of claim 10, wherein the processor is configured to modify the dynamic metadata included in one or more input content of the plurality of input content based on the statistics generated by the statistics generator circuits.

12. The apparatus of claim 1, wherein a first input content of a first processing channel of the plurality of processing channels includes dynamic metadata that is to be passed directly to a display device, wherein an input adaptation circuit of a processing channel of the plurality of processing channels is configured to perform an inverse function of an anticipated display processing the dynamic metadata, and wherein the processing channel of the plurality of processing channels is not the first processing channel.

13. The apparatus of claim 1, wherein a first input content of a first processing channel of the plurality of processing channels includes dynamic metadata that is to be passed directly to a display device, wherein the output adaptation circuit includes an adaptation block, corresponding to each processing channel other than the first processing channel of the plurality of processing channels, wherein the adaptation block is configured to perform an inverse function of an anticipated display processing of the dynamic metadata.

14. A method of improved rendering of video content, the method comprising:
  converting, using dynamic metadata, the video content to a compositing domain, wherein the converting is performed by a plurality of processing channels arranged in parallel, and wherein each of two or more processing channels of the plurality of processing channels comprises: a statistics generator circuit configured to receive the respective video content and to compute statistics based on a luma representation or a luma difference representation; and an input adaptation circuit configured to adapt the respective video content to the compositing domain based on the computed statistics;
  compositing video content including the adapted video content from the input adaptation circuits;
  generating a single composite output signal;
  adapting the single composite output signal to an output domain; and
  incorporating in at least one of the compositing domain or the output domain an inverse function of an anticipated display processing of the dynamic metadata,
  wherein the statistics computed by the statistics generator circuits includes a histogram,
  wherein the statistics generator circuits are separate from the input adaptation circuits,
  wherein the statistic generator circuits are arranged in parallel and process their respective video content received in parallel,
  wherein the input adaptation circuits are arranged in parallel and process their respective video content received in parallel, and
  wherein using the dynamic metadata comprises directly using or modifying the dynamic metadata.

15. The method of claim 14,
  wherein a domain includes at least some of a target brightness, a color volume, a white point or a color component representation, and
  wherein the compositing domain is associated with a compositor circuit, and the output domain is associated with an output adaptation circuit.

16. The method of claim 15, further comprising:
  providing output domain content to an output device including one of a display device or a video decoder; and
  receiving, by the compositor circuit from the output device, output parameters including peak brightness, color primaries, an overall output dynamic range.

17. The method of claim 15, wherein modifying the dynamic metadata is based on a weighted sum of the statistics generated by the statistics generator circuits.

18. A system, comprising:
  a processor; and
  a video processing block configured to receive video content, the video processing block comprising:
    a plurality of processing channels arranged in parallel and configured to receive the video content, wherein each of two or more processing channels of the plurality of processing channels comprises: a statistics generator circuit configured to receive the respective video content and to compute statistics based on a luma representation or a luma difference representation; and an input adaptation circuit configured to adapt the respective video content to a first format based on the computed statistics;
    a compositor circuit coupled to at least the input adaptation circuits and configured to generate a single composite output signal; and
    an output adaptation circuit coupled to the compositor circuit and configured to adapt the single composite output signal for an output device to a second format,
  wherein the statistics computed by the statistics generator circuits includes a histogram,
  wherein the statistics generator circuits are separate from the input adaptation circuits,
  wherein the statistic generator circuits are arranged in parallel and configured to process their respective video content received in parallel, and
  wherein the input adaptation circuits are arranged in parallel and configured to process their respective video content received in parallel.

19. The system of claim 18, wherein the processor is configured to incorporate dynamic metadata into an adapted composite output signal of the output adaptation circuit and wherein each of the input adaptation circuits and the output adaptation circuit comprises a color volume and luminance adaptation (CVLA) block.

20. The system of claim 18, wherein the processor is configured to generate dynamic metadata based on the statistics generated by the statistics generator circuits, wherein the processor is configured to modify the dynamic metadata included in one or more video content based on the statistics generated by the statistics generator circuits, wherein each input adaptation circuit of processing channels other than a first processing channel of the plurality of processing channels is configured to perform an inverse function of an anticipated display processing of the dynamic metadata.

* * * * *